US008244568B2

(12) United States Patent
Baron et al.

(10) Patent No.: US 8,244,568 B2
(45) Date of Patent: Aug. 14, 2012

(54) METHOD AND APPARATUS FOR GATHERING PARTICIPANT FREE TIME TO SCHEDULE EVENTS ON AN ELECTRONIC CALENDAR

(75) Inventors: Joseph G. Baron, Raleigh, NC (US); Frank Battaglia, Raleigh, NC (US); Jerrold Martin Heyman, Raleigh, NC (US); Michael Leonard Nelson, Raleigh, NC (US); Andrew Geoffrey Tonkin, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 11/776,939

(22) Filed: Jul. 12, 2007

(65) Prior Publication Data

US 2009/0018878 A1    Jan. 15, 2009

(51) Int. Cl.
    *G06Q 10/00* (2012.01)
(52) U.S. Cl. .......................................... 705/7.18; 705/6
(58) Field of Classification Search .................. 705/7, 8, 705/9
    See application file for complete search history.

(56) References Cited

U.S. PATENT DOCUMENTS

| | | | | | |
|---|---|---|---|---|---|
| 5,124,912 | A | * | 6/1992 | Hotaling et al. | 705/9 |
| 5,197,000 | A | * | 3/1993 | Vincent | 705/8 |
| 5,387,011 | A | * | 2/1995 | Freund | 283/61 |
| 5,963,913 | A | * | 10/1999 | Henneuse et al. | 705/9 |
| 6,016,478 | A | * | 1/2000 | Zhang et al. | 705/7.19 |
| 6,085,166 | A | * | 7/2000 | Beckhardt et al. | 705/7.18 |
| 6,477,504 | B1 | * | 11/2002 | Hamlin et al. | 705/7.32 |
| 7,108,173 | B1 | * | 9/2006 | Wang et al. | 235/377 |
| 7,679,518 | B1 | * | 3/2010 | Pabla et al. | 340/573.1 |
| 2001/0014867 | A1 | * | 8/2001 | Conmy | 705/9 |
| 2003/0004773 | A1 | * | 1/2003 | Clark et al. | 705/8 |
| 2003/0036941 | A1 | * | 2/2003 | Leska et al. | 705/9 |
| 2003/0130882 | A1 | * | 7/2003 | Shuttleworth et al. | 705/8 |
| 2003/0233265 | A1 | * | 12/2003 | Lee et al. | 705/8 |
| 2004/0064567 | A1 | | 4/2004 | Doss | |
| 2005/0102245 | A1 | * | 5/2005 | Edlund et al. | 705/80 |
| 2006/0026240 | A1 | * | 2/2006 | Anthony et al. | 709/206 |
| 2006/0200374 | A1 | * | 9/2006 | Nelken | 705/9 |
| 2007/0143168 | A1 | * | 6/2007 | Plas | 705/9 |
| 2008/0015922 | A1 | * | 1/2008 | Nelken | 705/8 |
| 2008/0177611 | A1 | * | 7/2008 | Sommers et al. | 705/8 |

FOREIGN PATENT DOCUMENTS

| | | | |
|---|---|---|---|
| JP | 2002117204 | * | 4/2002 |
| WO | WO 01/37541 A2 | | 5/2001 |

OTHER PUBLICATIONS

"Outlook/Time-saving add-ins," published by web.archive.org and office—addins.com on Mar. 19, 2005. pp. 1-3 of 3.*

(Continued)

*Primary Examiner* — John Hayes
*Assistant Examiner* — Brian Epstein
(74) *Attorney, Agent, or Firm* — Matt Talpis; Mark P Kahler (57) ABSTRACT

A scheduling system includes a client calendar application that a meeting organizer employs to send a request for free time form to prospective participants of a future meeting via email. The client calendar application receives completed request for participant free time forms back from the prospective participants via email. The client calendar application parses the completed free time forms and determines a consensus free time when all prospective participants are free for the meeting.

18 Claims, 7 Drawing Sheets

OTHER PUBLICATIONS

"Gathering Informatin with Outlook Voting Buttons," published by www.windowsitpro.com on Nov. 20, 2001. pp. 1-4 of 4.*

Brzozowski—"GroupTime: Preference-Based Group Scheduling", CHI (Apr. 22, 2006).

Fordham—"Lotus Notes v6—Calendaring and Scheduling Guide", Fordham Univ. (downloaded from www.fordham.edu on May 12, 2007).

UNLV—"Lotus Notes Basics Release 4.6", Office of Info Tech, Univ. of Nevada, Las Vegas (Jul. 23, 1998).

Easy Survey—"Easy Survey 1.3.3 Microsoft Office Add-in for Survey Creation and Conducting", pp. 1-2, downloaded from http://www.office-outlook.com/outlook-addins/easy-survey.html on Jan. 25, 2012.

* cited by examiner

FIG. 1A

| 100 | | | |
|---|---|---|---|
| | TUESDAY, JULY 1 | WEDNESDAY, JULY 2 | THURDAY, JULY 3 |
| LEADER | 10 am – 12:30 pm<br>2:30 pm – 4 pm | 9 am – 11:30 pm | 4 pm – 5:30 pm |
| PARTICIPANT 1 | | | |
| PARTICIPANT 2 | | | |
| PARTICIPANT 3 | | | |
| PARTICIPANT 4 | | | |

FIG.1B

| 100' | | | |
|---|---|---|---|
| | TUESDAY, JULY 1 | WEDNESDAY, JULY 2 | THURDAY, JULY 3 |
| LEADER | 10 am – 12:30 pm<br>2:30 pm – 4 pm | 9 am – 11:30 pm | 4 pm – 5:30 pm |
| PARTICIPANT 1 | | | |
| PARTICIPANT 2 | 10 am – 11:30 am | 9 am – 11 am | 4 pm – 5:30 pm |
| PARTICIPANT 3 | | | |
| PARTICIPANT 4 | | | |

|  | TUESDAY, JULY 1 | WEDNESDAY, JULY 2 | THURDAY, JULY 3 |
|---|---|---|---|
| LEADER | 10 am – 12:30 pm<br>2:30 pm – 4 pm | 9 am – 11:30 pm | 4 pm – 5:30 pm |
| PARTICIPANT 1 | 10 am – 11:30 am | 9 am – 11 am | N/A |
| PARTICIPANT 2 | 10 am – 11:30 am | 9 am – 11 am | 4 pm – 5:30 pm |
| PARTICIPANT 3 | 10 am – 11:30 am | N/A | N/A |
| PARTICIPANT 4 | 10 am – 11:30 am | N/A | 4 pm – 5:30 pm |

|  | SUNDAY | 30 Mon June, 2006 | 1 Tues July, 2006 | 2 Wed July, 2006 | 3 Thurs July, 2006 | 4 Fri July, 2006 | SATURDAY |
|---|---|---|---|---|---|---|---|
| 7 AM | | | | | | | |
| 8 AM | | FREE | | | FREE | | |
| 9 AM | | | | | | | |
| 10 AM | | | FREE | | | | |
| 11 AM | | | | | | | |
| 12 PM | | FREE | | | FREE | | |
| 1 PM | | | | | | | |
| 2 PM | | | FREE | | | FREE | |
| 3 PM | | | | | | | |
| 4 PM | | | | | | | |
| 5 PM | | | | | | | |
| 6 PM | | | | | | | |
| 7 PM | | | | | | | |

FIG. 4

| | | 30 Mon June, 2006 | 1 Tues July, 2006 | 2 Wed July, 2006 | 3 Thurs July, 2006 | 4 Fri July, 2006 |
|---|---|---|---|---|---|---|
| | 08:00 am | | | | | |
| | 9:00 | | | | | |
| | 10:00 | | | | | |
| | 11:00 | | | | | |
| | 12:00 pm | | | | | |
| | 1:00 | | | | | |
| | 2:00 | | | | | |
| | 3:00 | | | | | |
| | 4:00 | | | | | |

METHOD AND APPARATUS FOR GATHERING PARTICIPANT FREE TIME TO SCHEDULE EVENTS ON AN ELECTRONIC CALENDAR

TECHNICAL FIELD OF THE INVENTION

The disclosures herein relate generally to calendaring systems, and more particularly to electronic calendaring systems.

BACKGROUND

Calendar software is available that runs on networked information handling systems (IHSs) to enable users to more easily schedule meetings and events over a network rather than by telephone. For example, several local client IHSs connect via a network to a server IHS that includes server calendar software. Each client IHS includes client calendar software. A meeting leader or organizer may use the calendar software to send meeting invitations that designate a particular time, duration and place to prospective meeting participants. The prospective participants may accept or decline the invitations depending on their available free time. This approach may take several iterations until all the participants agree on a particular meeting day and time.

Rather than using electronic calendar software to organize a meeting or other event, several reasons exist that cause meeting organizers to manually email or otherwise manually poll each prospective participant to gather free time information from them. Often a meeting organizer will send a manually generated schedule table to prospective participants to determine common free time from the prospective participants. A typical schedule table includes rows wherein one row corresponds to the meeting leader and the remaining rows correspond to prospective participants. The schedule table may also include columns that correspond to respective days when a meeting or event may occur. The prospective participants receive the schedule table via email and then fill in the schedule table to show when they are free to meet. The prospective meeting participants then manually send the marked-up schedule table back to the meeting organizer via email. The meeting organizer studies the schedule table received from each prospective participant to determine a common free time that all prospective participants have available for the meeting. This process is manual because it does not rely on an automatic free time scheduler in calendar software.

Modern calendar and scheduling software applications often include automatic free time schedulers. Calendar users may choose to display their free time to all meeting organizers, to particular meeting organizers, to meeting organizers in a particular group or to no organizers. When a meeting organizer selects participants for a new meeting, the organizer's calendar program displays the free time of the participants to the extent that the participants allow the display of their free time information.

Several reasons exist why a meeting organizer or secretary would use the manual process with a schedule table described above instead of any automatic free time scheduler built into calendar software. For example, meetings may include participants outside of a particular business entity wherein those participants employ incompatible calendar software. Another reason is that participants may choose to hide their free time information from calendar software. Yet another reason is that participants may not regularly update their free time information on their calendar software, and thus the free time that their calendar software indicates is not reliable. Still another reason is that depending on the importance of the meeting, participants may elect to include free times in their response that otherwise appear as unavailable in an automatic free time scheduler in calendar software. For example, if a meeting is very important a participant may show their lunch hour as available free time, whereas if a meeting is of low importance the participant may show that time as unavailable.

The current manual method of gathering of free time information by sending a schedule table via email is straightforward. However, this method is labor intensive and thus prone to error, especially as the number of prospective participants increases. Unfortunately, the current manual method of gathering free time information frequently requires multiple iterations to achieve consensus on a common free time for all participants.

What is needed a method of gathering free time information from prospective meeting participants that addresses the above problems.

SUMMARY

Accordingly, in one embodiment, a method of scheduling a meeting is disclosed that includes providing meeting time information, by a meeting organizer to a calendar application, the meeting time information including candidate times for a meeting with prospective participants. The method also includes selecting, by the meeting organizer, a request participant free time option in the calendar application. The method further includes generating a respective request for participant free time form for each prospective participant, by the calendar application in response to selection of the request participant free time option, each request for free time form including candidate meeting times. The method still further includes transmitting via email, by the calendar application, a respective request for participant free time form to each prospective meeting participant.

In another embodiment, a system for scheduling a meeting is disclosed that includes a communication network. The system also includes a plurality of prospective participant client IHSs that couple to the communication network. The method further includes a meeting organizer's client information handling system (IHS) that couples via the communication network to the plurality of prospective participant client IHSs. The meeting organizer's client IHS includes a client calendar application to which the meeting organizer provides meeting time information including candidate times for a meeting with prospective participants. The client calendar application includes a request participant free time option that is selectable by the meeting organizer. The client calendar application transmits via email a respective request for participant free time form to each prospective participant in response to selection of the request participant free time option, each request for participant free time form including candidate meeting times.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1A:
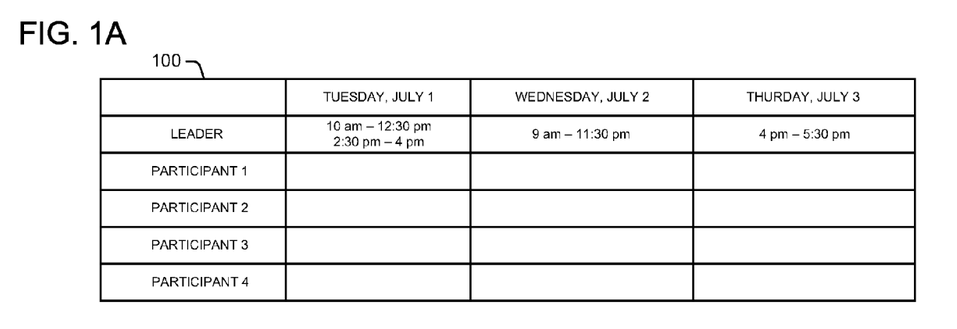
FIG. 1A-1C show representative participant free time request forms at different stages of completion.

FIG. 1A is a representation of one simplified electronic form 100 that the disclosed calendar software application may send to prospective meeting participants to determine their respective free times for a meeting or other activity. The prospective participants include prospective participants 1-4. In this embodiment, electronic form 100 is a table that lists the prospective participants in rows and the possible meeting days in columns. The meeting organizer lists the times when the meeting leader is available for the meeting for each column day in the leader's row. For example, FIG. 1A shows a form 100 wherein the meeting leader is available on Tuesday, July 1, from 10 am-12:30 pm and 2:30 pm to 4 pm. Form 100 also shows that the meeting leader is available on Wednesday, July 2, from 9 am-11:30 pm. Form 100 further shows that the meeting leader is available on Thursday, July 3, from 4 pm-5:30 pm.

Figure 1B:
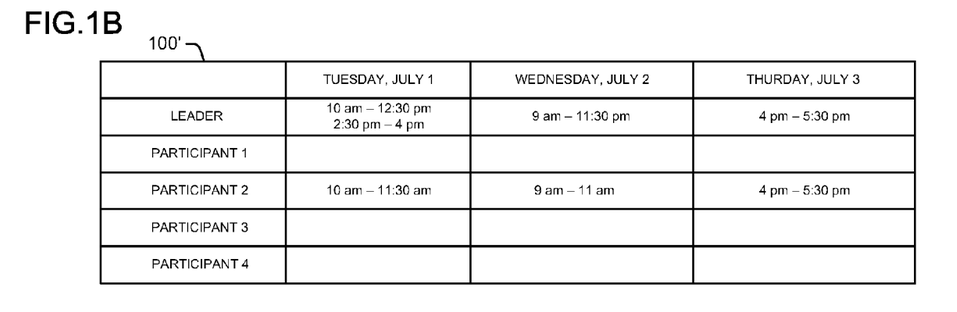
Figure 1C:
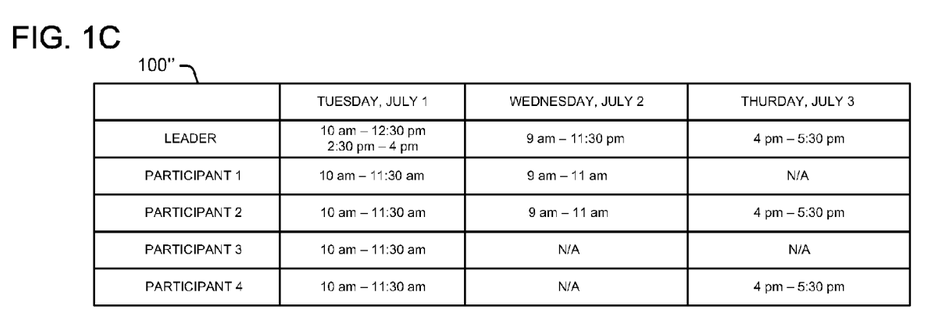

The meeting organizer sends form 100 of FIG. 1A to the prospective participants via email or other network communication mechanism. When a prospective participant receives form 100, the participant types in or otherwise inputs his or her free times for each day that the meeting organizer specified in form 100. For example, as shown in FIG. 1B, participant 2 lists his available time as 10 am - 11:30 am on Tuesday, July 1. Participant 2 lists his available time as 9 am - 11:00 am on Wednesday, July 2. Participant 2 lists his available time as 4 pm - 5:30 pm on Thursday, July 3. Each participant inputs his or her free time information in this manner on a respective participant row of form 100, thus resulting in a completed form 100' as shown in FIG. 2B. If a particular participant is not available during one of the time slots that form 100 specified, then that participant enters N/A (not available) or other designation of no free time during that time slot. Leaving a day blank means that a particular participant has no free time that day. Each participant transmits a respective completed form 100' back to the meeting organizer's calendar software application. In response, the meeting organizer's calendar software application receives the completed forms 100' from the respective participants and combines the information received from the respective users into a single form or table 100" as shown in FIG. 1C. The meeting organizer's calendar software application may parse the information in form 100" and determine a consensus free time when all prospective participants and the meeting leader indicate a common free time. The meeting organizer then schedules the meeting for the consensus free time. However, if the meeting organizer's calendar software application does not initially find a consensus free time, then the meeting organizer may change the days and/or leader free times in form 100 and again send the form to the prospective participants to find a consensus free time. The meeting organizer may perform as many iterations of this method as needed to find a consensus free time or common free time when the meeting leader and all participants are available. A client calendar application may employ plain text, html or xml text to create the forms 100 and 100' for the participants to complete. Likewise, a prospective participant may complete such forms with plain text, html or xml responses, thus resulting in completed form 100".

Figure 2:
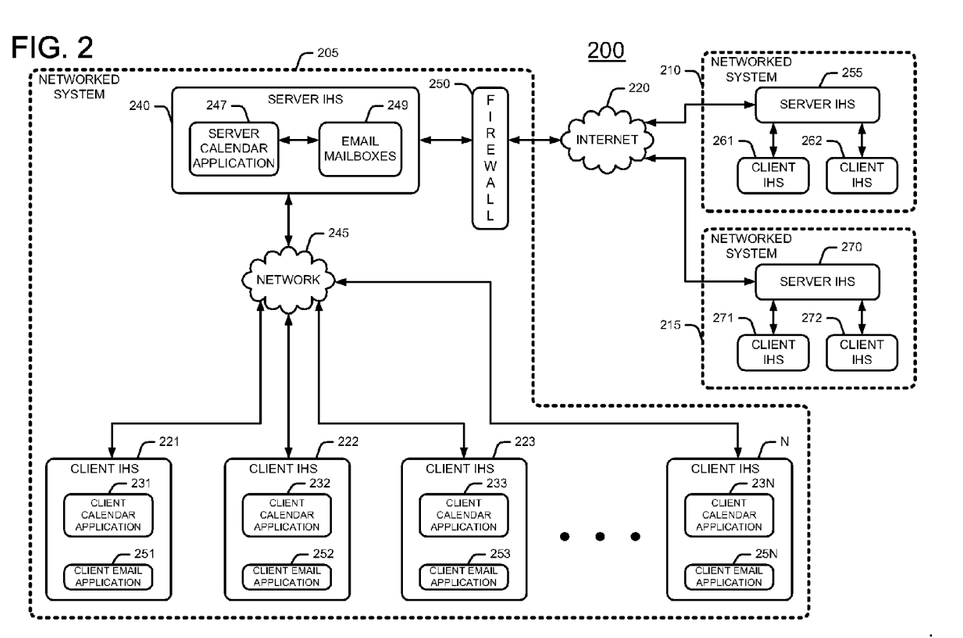
FIG. 2 is block diagram of one embodiment of the disclosed meeting scheduling system.

FIG. 2 is a block diagram of one embodiment of calendar scheduling system 200. System 200 includes a number of server information handling systems (IHSs) and a number of client IHSs. In actual practice, these IHSs may take many forms. For example, an IHS may take the form of a desktop, portable, laptop, notebook, minicomputer or mainframe computer or other form factor computer or data processing system. An IHS may also take other form factors such as a gaming device, a personal digital assistant (PDA), a portable telephone device, a communication device or other devices that include a processor and memory. In the representative system 200 of FIG. 2, system 200 includes a networked system 205 within a particular organization or business entity, and further includes networked systems 210 and 215 in other organizations or business entities. The Internet 220 couples networked systems 205, 210 and 215 together.

Networked system 205 includes client IHSs 221, 222, 223. . . N, wherein N is the total number of client IHSs in networked system 205. Client IHSs 221, 222, 223. . . N respectively include client calendar applications 231, 232, 233, . . . 23N that each communicate with a server IHS 240 via a network 245 therebetween, as shown in FIG. 2. Server IHS 240 includes server calendar application 247 and email mailboxes 249. Mailboxes 249 include a respective server mailbox for each of client IHSs 221, 222, 223,. . . N. Networked system 205 further includes a firewall 250 that couples the server IHS 240 to the Internet 220. In this manner, client IHSs 221, 222, 223. . . N and the server IHS 240 may communicate with server IHSs and client IHSs external to the organization or business entity to which networked system 205 corresponds. The dashed line 205 in FIG. 2 corresponds not only to networked system 205 but also to the organization or business entity that employs networked system 205. Client IHSs 221, 222, 223 and N respectively include client email applications 251, 252, 253 and 25N that communicate via network 245 with email mailboxes 249 in server IHS 240. In this manner, client IHSs 221, 222, 223 and N may communicate among one another and with external IHSs via email.

Networked systems 210 and 215 couple to networked system 205 via the Internet 220 or other network. The dashed lines 210 and 215 indicate not only networked systems 210 and 215, but also the respective organizations or business entities that employ networked systems 210 and 215. In more detail, networked system 210 includes a server IHS 255 that couples to client IHSs 261 and 262. Networked system 215 includes server IHS 270 that couples to client IHSs 271 and 272.

A meeting organizer who operates client IHS 221 may employ client calendar application 231 to send a free time request form 100 to prospective participants at client IHSs 222, 223 . . . N within the networked system 205. The meeting organizer may also employ client calendar application 231 of client IHS 221 to send a free time request form 100 to prospective participants at client IHS 261, client IHS 262, client IHS 271 and client IHS 272 that all exist external to the organization or business entity of networked system 205. Client IHSs 261, 262, 271 and 272 each include client email applications (not shown) so they may communicate with one another and client IHSs 221, 222, 223 and N via email.

Figure 3:
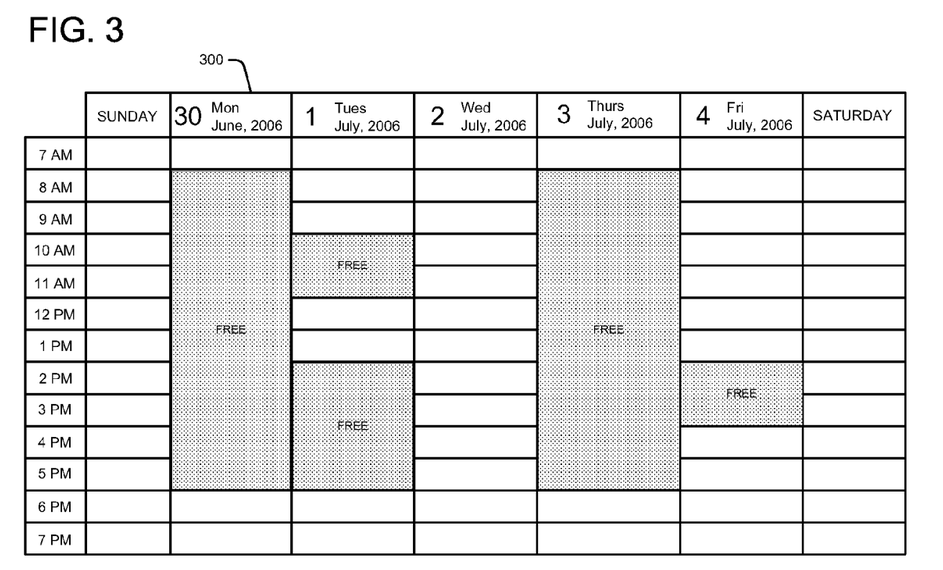
FIG. 3 is a representation of one example of the request for participant free time form that the meeting scheduling system employs.

FIG. 3 shows a more advanced free time request form 300 that is usable in place of free time request form 100 described above. In this particular representation of free time request form 300, the form is a table that includes seven columns that correspond respectively to the seven days of the week, Sunday through Saturday. Free time request form 300 includes several rows that respectively correspond to the hours during the day in which a meeting organizer may desire to schedule a meeting or other event. The meeting organizer at client IHS 221 instructs client calendar application 231 to transmit form 300 to respective prospective participants at other client IHSs. Each prospective participant indicates his or her free time on the particular free time request form 300 that each prospective participant receives. FIG. 3 shows one example of how a prospective participant may markup form 300 to indicate that participant's free time. The prospective participant may use the mouse or other pointing device of the participant's IHS to highlight those hours during each day when that participant is available or free for the requested meeting. Unmarked time on form 300 corresponds to those times during which the prospective participant is not available. In one embodiment, the meeting organizer employs client calendar application 231 to generate request form 300 and send form 300 the prospective participants via e-mail or other network service. Accordingly, the client IHSs require no special software to display the received free time request forms 300 other than an e-mail client application capable of displaying a graphical representation such as form 300. Client calendar application 231 may employ plain text, html or xml text to create the forms 300 for the participants to complete. Likewise, a prospective participant may complete such forms with plain text, html or xml responses, according to the particular form that the participant receives.

Figure 4:
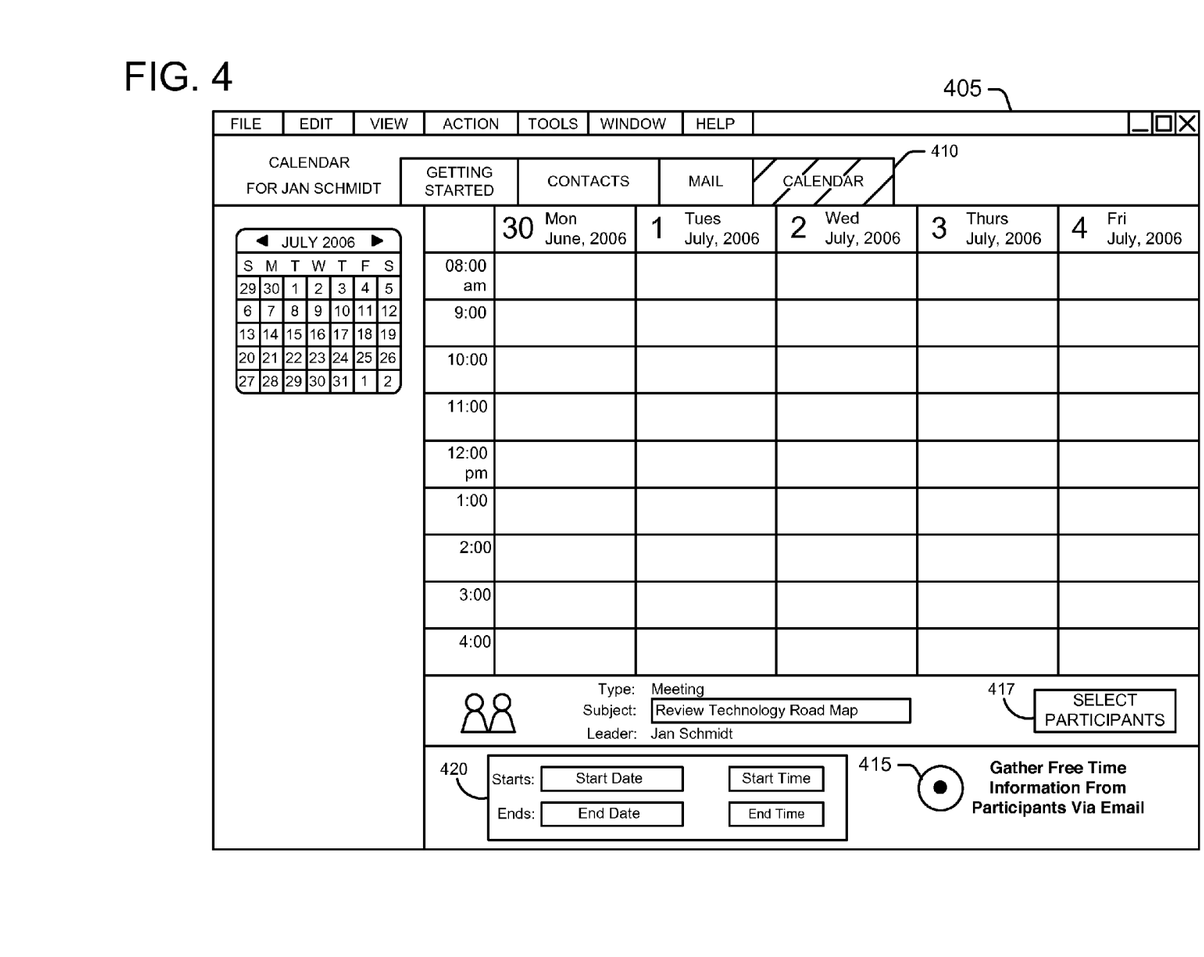
FIG. 4 is a representative input window that the client calendar application of the disclosed meeting scheduling system generates when a meeting organizer opens the client calendar application and selects a calendar tab.

FIG. 4 shows an input window 405 that client calendar application 231 generates when a meeting organizer opens the application and selects calendar tab 410. The meeting organizer may employ input window 405 to schedule a meeting of multiple participants at a particular date and time. However, before actually requesting a meeting of participants at a particular date and time, the meeting organizer may first select a "Gather Free Time Information From Participants Via Email" option by clicking on radio button 415 with a mouse or other pointing device. In response to selecting radio button 415 and selecting prospective meeting participants, client calendar application 231 of the meeting organizer's IHS 221 generates free time table 100 of FIG. 1A or free time table 300 of FIG. 3. Assume for purposes of example, that client calendar application 231 generates free time form or table 300 and sends a form 300 via email to each of the prospective participants at their respective IHSs. The prospective participants receive the form 300 at their respective IHSs. Each participant then completes their respective form 300 to indicate their free time. For example, the participant may employ a mouse or pointing device to select free times with a click and drag motion across one or more time slots of form 300. In the representative completed form 300 of FIG. 3, the user pointed and dragged a pointing device from 8 am to 5 pm on Monday, thus causing application 231 to label the time slot between 8 am and 5 pm on Monday as free time. Using this technique, the participant also indicates free time on Tuesday between 10 am and 12 noon, and 2 pm through 6 pm. The participant also designates free time on Thursday between 8 am and 5 pm, and on Friday between 2 pm and 4 pm. Each participant completes a respective free time form 300 and transmits a completed free time form back to the IHS 221 of the meeting organizer.

Client calendar application 231 of client IHS 221 receives the completed free time forms of the prospective participants via email over network 245. Client calendar application 231 then parses the free time information from each of the prospective participants and determines if a consensus free time exists. In other words, client calendar application 231 parses the free time information in each participant's free time information form and then compares these participant free times with one another and the meeting leader's free time. Client calendar application 231 performs this compare operation to determine if a consensus time exists among the participants' and meeting leader's free time. Lotus Notes, modified with the teachings herein, is an example of one calendar client application that a client IHS may employ to practice the disclosed free time consensus determination and meeting scheduling methodology. (Lotus Notes is a trademark of the IBM Corporation.)

Figure 5:
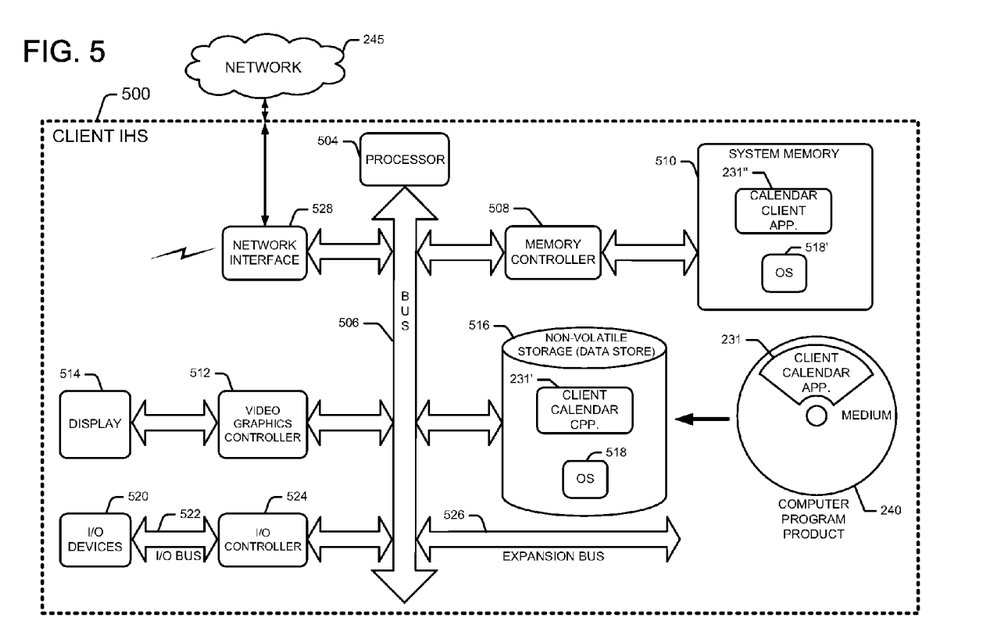
FIG. 5 is a block diagram of an information handling system (IHS) that the meeting scheduling system may employ as a client IHS.

FIG. 5 shows an information handling system (IHS) 500 that system 200 may employ as client IHS 221. Client IHS 500 includes calendar application software that enables the meeting organizer to send a free time request form via email from the organizer's client IHS 500 (namely client IHS 221) to prospective participants at other IHSs. Client IHS 500 includes a processor 504 that couples to a bus 506. A memory controller 508 couples system memory 510 to bus 506. A video graphics controller 512 couples display 514 to bus 506. Client IHS 500 includes nonvolatile storage 516, such as a hard disk drive, CD drive, DVD drive, or other nonvolatile storage that couples to bus 506 to provide client IHS 500 with permanent storage of information. Nonvolatile storage 516 is a form of data store. An operating system (OS) 518 loads from nonvolatile storage 516 to memory 510 as OS 518' to govern the operation of client IHS 500. I/O devices 520, such as a keyboard and a mouse pointing device, couple via I/O bus 522 and I/O controller 524 to bus 506. One or more expansion busses 526, such as USB, IEEE 1394 bus, ATA, SATA, PCI, PCIE and other busses, couple to bus 506 to facilitate the connection of peripherals and devices to client IHS 500. A network interface 528 couples to bus 506 to enable client IHS 500 to connect by wire or wirelessly to network 245 and other client and server IHSs. Network 245 may be a local area network (LAN), a wide area network (WAN), an internet protocol (IP) network, or other connective apparatus. Client IHS 500 may take many forms. For example, client IHS 500 may take the form of a desktop, server, portable, laptop, notebook, or other form factor computer or data processing system. Client IHS 500 may also take other form factors such as a personal digital assistant (PDA), a gaming device, a portable telephone device, a communication device or other devices that include a processor and memory.

Client IHS 500 may employ a compact disk (CD), digital versatile disk (DVD), floppy disk, external hard disk or virtually any other digital storage medium as medium 240. Medium 240 stores client calendar application 231 thereon. A user or other entity installs client calendar application 231 on client IHS 500 prior to usage of this application. The designation, client calendar application 231', describes client calendar application 231 after installation on client IHS 500. The designation, client calendar application 231", describes client calendar application 231 after client IHS 500 loads the client calendar application into system memory 510 for execution.

Figure 6:
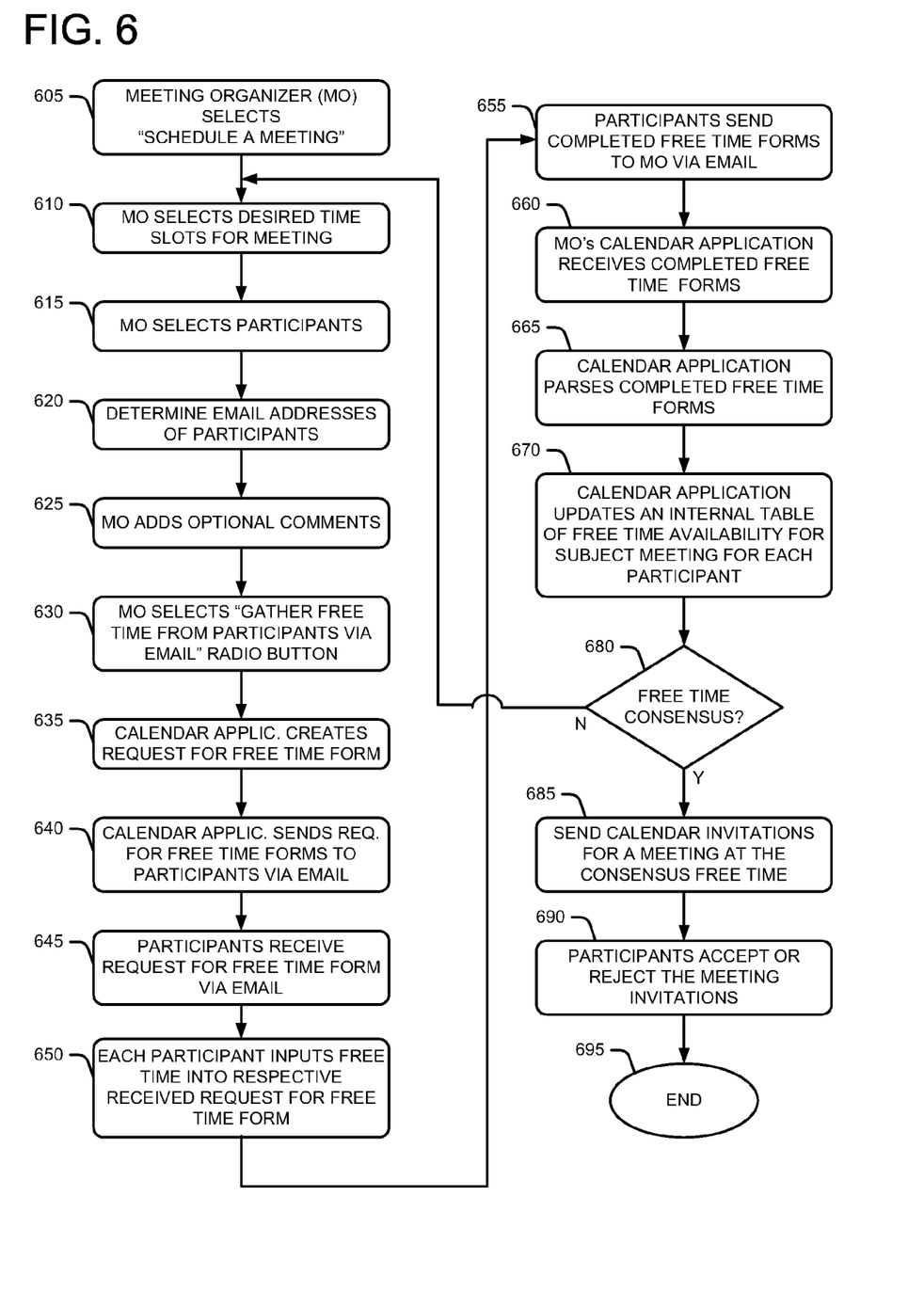
FIG. 6 is a flow chart that depicts the disclosed meeting scheduling methodology that the meeting scheduling system employs.

FIG. 6 is a flow chart that depicts a representative process flow for one embodiment of the disclosed meeting scheduling and free time gathering methodology. The meeting organizer (MO) or leader, namely the operator of client IHS 221 in this example, selects a "schedule a meeting" option in their client calendar application 231, as per block 605. In response, client application 231 generates a "schedule a meeting" display image such as window 405 of FIG. 4. The meeting organizer then selects a number of candidate days and times for a meeting, as per block 610, by inputting these time slots in start date/end date start time/end time box 420 of FIG. 4. These time slots together provide meeting time information. After selecting desirable time slots for the meeting, the meeting organizer selects prospective participants in a conventional manner, as per block 615. For example, the meeting organizer clicks on the "select participants" box 417 of window 405 in FIG. 4. The meeting organizer may then input the names of the prospective participants or alternatively select from a list of previously stored contacts that includes email address information. If the email address of a prospective participant is not found in block 615, then block 620 determines the email address of that participant. For example, as per block 620, client calendar application 231 will prompt the meeting organizer for the email address of any participants for whom the email address is not known by client calendar application 231.

The meeting organizer may optionally input any comments relative to the meeting, as per block 625. To determine when the prospective participants may be free, rather than relying on the electronic calendars of the prospective participants that may not be up to date, the meeting organizer may select the "Gather Free Time Information From Participant Via Email" radio button 415 of window 405, as per block 630. In response to this selection, client calendar application 231 generates a request for free time form or table such as request for free time form 100' of FIG. 1B or request for free time form 300 of FIG. 3, as per block 635. Client calendar application 231 sends the request for free time form 300 to the prospective participants via e-mail, as per block 640. The prospective participants receive requests for free time forms at their respective client IHSs, as per block 645. More specifically, e-mail applications within the respective client IHSs of the participants actually receive the request for free time forms. Each prospective participant then inputs their respective free time into their own request for free time form, as per block 650. The prospective participant may perform this free time information input within the e-mail client program (not shown) that each participant's client IHS employs. In other words, it is not necessary that the prospective participant's IHS employ a client calendar application to respond to the request for free time form. Rather, the prospective participant may complete form 300 within his or her e-mail client application. The participants then send the completed request for free time forms to the meeting organizer via e-mail, as per block 655.

The meeting organizer's client calendar application 231 receives the completed free time forms from the prospective participants, as per block 660. Client calendar application 231 parses the information in the received completed free time forms, as per block 665. In other words, client calendar application 231 reads the particular times from the request form that each participant indicates are free for a meeting or other event. Client calendar application 231 maintains an internal table (not shown) that stores the free time information for each prospective participant, as derived from each prospective participant's completed request for free time form, as per block 670. Client calendar application 231 accesses this internal table to determine a consensus time that all participants indicate as being free time available for a meeting or other event. Client calendar application 231 conducts a test at decision block 680 to determine if client calendar application 231 determined a consensus free time. If client calendar application 231 successfully determined a consensus free time, then client calendar application 231 sends invitations for a meeting to the prospective participants at the consensus free time, as per block 685. The participants accept or reject respective meeting invitations, as per block 690. The client IHSs of the prospective participants transmit the accepted or rejected meeting invitations back to client calendar application 231 of the meeting organizer's client IHS 221. In one embodiment, the client IHSs of the prospective participants employ respective client calendar applications to respond to such invitations. Process flow ends at end block 695. However, if at decision block 680, client calendar application 231 is unable to determine a consensus free time, then process flow continues back to block 610 at which the meeting organizer may select different potential timeslots for the meeting. While in the flowchart of FIG. 6, the meeting organizer schedules the meeting and sends the free time request forms to the prospective participants, in actual practice the meeting organizer may be the meeting leader, the leader's secretary or other designee of the leader.

Those skilled in the art will appreciate that the various structures disclosed can be implemented in hardware or software. Moreover, the methodology represented by the blocks of the flowchart of FIG. 6 may be embodied in a computer program product, such as a media disk, media drive or other media storage such as computer program product medium 240 of FIG. 5.

In one embodiment, the disclosed methodology is implemented as a client calendar application, namely sets of instructions (program code) in a code module which may, for example, be resident in system memory 510 of client IHS 221 of FIG. 5. Until required by client IHS 221, the set of instructions may be stored in another memory, for example, non-volatile storage 516 such as a hard disk drive, or in a removable memory such as an optical disk or floppy disk, or downloaded via the Internet or other computer network. Thus, the disclosed methodology may be implemented in a computer program product for use in a computer such as client IHS 221. It is noted that in such a software embodiment, code that carries out the functions depicted in the FIG. 6 flow chart may be stored in system memory 510 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses a methodology and apparatus for scheduling events on an electronic calendar. In one embodiment, the methodology determines free time information of prospective participants via email. The disclosed method is particularly useful when prospective participants do not keep their calendar information up-to-date such that automatically displayed free time information may be incomplete or inaccurate.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

We claim:

1. A method of scheduling a meeting comprising:
receiving meeting time information from a meeting organizer, by a calendar application of a meeting organizer information handling system (IHS), the meeting time information including candidate times for a meeting with prospective participants, the meeting time information indicating times when the meeting organizer is available;
receiving from the meeting organizer, by the calendar application of the meeting organizer IHS, a selection of a request participant free time option;
generating a respective request for participant free time form for each prospective participant, by the calendar application of the meeting organizer IHS, in response to selection of the request participant free time option, each request for free time form including candidate meeting times;
transmitting via email, by the calendar application of the meeting organizer IHS, a respective request for participant free time form to each prospective meeting participant;
receiving from the prospective meeting participants, by the calendar application of the meeting organizer IHS, completed request for participant free time forms;
combining, by the calendar application of the meeting organizer IHS, the completed request for participant free time forms into a single form;
parsing, by the calendar application of the meeting organizer IHS, the single form to determine the free times associated with each prospective participant;
determining, by the calendar application of the meeting organizer IHS, a consensus free time from the free times associated with each prospective participant; and
transmitting via email, by the calendar application of the meeting organizer IHS, to each prospective meeting participant the consensus free time as a first invitation for the meeting that includes the consensus time for the meeting.

2. The method of claim 1, wherein the candidate meeting times correspond to selected days or portions of days.

3. The method of claim 1, further comprising:
receiving, by a prospective participant email application of a prospective participant IHS, a respective request for participant free time form thus resulting in a received request for participant free time form; and
completing, by a prospective participant of the prospective participant IHS, the received request for participant free time form to include free time of the prospective participant within the candidate times of the received request for participant free time form.

4. The method of claim 1, wherein the received request for participant free time form is a table.

5. The method of claim 1, wherein the calendar application of the meeting organizer is associated with a particular business entity, and wherein the transmitting step further comprises:
transmitting, by the calendar application of the meeting organizer IHS, the request for participant free time form to a client IHS in the particular business entity.

6. The method of claim 1, wherein the calendar application of the meeting organizer is associated with a particular business entity, and wherein the transmitting step further comprises:
transmitting, by the calendar application of the meeting organizer IHS, the request for participant free time form to a client IHS in an business entity different from the particular business entity.

7. The method of claim 1, wherein the request for participant free time form is in one of plain text, html, or xml format for transmission to prospective participants via email.

8. A system for scheduling a meeting comprising:
a communication network;
a plurality of prospective participants' client IHSs that couple to the communication network;
a meeting organizer's client information handling system (IHS) that couples via the communication network to the plurality of prospective participants' client IHSs, the meeting organizer's client IHS including a client calendar application to which the meeting organizer provides meeting time information including candidate times for a meeting with prospective participants, the meeting time information indicating times when the meeting organizer is available, the client calendar application including a request participant free time option that is selectable by the meeting organizer, the client calendar application transmitting via email a respective request for participant free time form for each prospective participant in response to selection of the request participant free time option, each request for participant free time form including candidate meeting times, wherein the client calendar application receives from the prospective meeting participants completed request for participant free time forms, wherein the client calendar application combines the completed request for participant free time forms into a single form, wherein the client calendar application parses the single form to determine the free times associated with each prospective participant, wherein the client calendar application determines a consensus free time from the fee times associated with each prospective participant, and wherein the client calendar application transmits a first invitation for the meeting to each prospective meeting participant, the first invitation including the consensus free time for the meeting.

9. The system of claim 8, wherein the candidate meeting times correspond to selected days or portions of days.

10. The system of claim 8, wherein the plurality of prospective participants' client IHSs include respective email applications that receive a respective request for participant free time form.

11. The system of claim 10, wherein the email applications of the plurality of prospective participants' clients IHSs are configured to enable the prospective participant to enter free time of the prospective participant within the candidate times of a received request for participant free time form, thus resulting in a completed request for participant free time form for each prospective participant that the prospective participant transmits to the calendar application of the meeting organizer's IHS.

12. The system of claim 10, wherein the received request for participant free time form is a table.

13. The system of claim 10, wherein the calendar application of the meeting organizer is associated with a particular business entity and the calendar application of the meeting organizer is configured to transmit a request for participant free time form to a client IHS in the particular business entity.

14. The system of claim 10, wherein the calendar application of the meeting organizer is associated with a particular business entity and the calendar application of the meeting organizer is configured to transmit a request for participant free time form to a client IHS in an business entity different from the particular business entity.

15. The system of claim 10, wherein the request for participant free time form is in one of plain text, html, or xml format for transmission to prospective participants via email.

16. A calendar client computer program product, comprising:
a non-transitory computer readable storage medium;
first instructions that receive meeting time information from a meeting organizer, the meeting time information including candidate times for a meeting with prospective participants, the meeting time information indicating times when the meeting organizer is available;
second instructions that display a request participant free time option that is selectable by the meeting organizer;
third instructions that transmit via email a respective request for participant free time form to each prospective participant in response to selection of the request participant free time option by the meeting organizer, each request for participant free time form including candidate meeting times;
fourth instructions that receive from the prospective meeting participants completed request for participant free time forms;
fifth instructions that combine the completed request for participant free time forms into a single form;
sixth instructions that parse the single form to determine the free times associated with each prospective participant; and
seventh instructions that determine a consensus free time from the fee times associated with each prospective participant;
eighth instructions that transmit via email to each prospective meeting participant the consensus free time as a first invitation for the meeting that includes the consensus time for the meeting;
wherein the first, second, third, fourth, fifth, sixth, seventh and eighth program instructions are stored on the non-transitory computer readable storage medium.

17. The calendar client computer program product of claim 16, wherein the candidate meeting times correspond to selected days or portions of days.

18. The calendar client computer program product of claim 16, wherein the request for participant free time form is a table in one of plain text, html, or xml format for transmission to prospective participants via email.

* * * * *